US010761820B2

(12) United States Patent
Poxon et al.

(10) Patent No.: US 10,761,820 B2
(45) Date of Patent: *Sep. 1, 2020

(54) ASSISTING PARALLELIZATION OF A COMPUTER PROGRAM

(71) Applicant: Cray Inc., Seattle, WA (US)

(72) Inventors: Heidi Poxon, Chippewa Falls, WI (US); John Levesque, Knoxville, TN (US); Luiz DeRose, Mendota Heights, MN (US); Brian H. Johnson, Chippewa Falls, WI (US)

(73) Assignee: Cray, Inc., Seattle, WA (US)

( * ) Notice: Subject to any disclaimer, the term of this patent is extended or adjusted under 35 U.S.C. 154(b) by 349 days.

This patent is subject to a terminal disclaimer.

(21) Appl. No.: 14/978,211

(22) Filed: Dec. 22, 2015

(65) Prior Publication Data

US 2016/0110174 A1    Apr. 21, 2016

Related U.S. Application Data

(63) Continuation of application No. 14/033,306, filed on Sep. 20, 2013, now Pat. No. 9,250,877.

(51) Int. Cl.
*G06F 8/41* (2018.01)
*G06F 11/34* (2006.01)
*G06F 8/30* (2018.01)

(52) U.S. Cl.
CPC .............. *G06F 8/4443* (2013.01); *G06F 8/30* (2013.01); *G06F 8/314* (2013.01); *G06F 8/423* (2013.01);

(Continued)

(58) Field of Classification Search
CPC .......... G06F 8/314; G06F 8/443; G06F 8/456; G06F 8/30–31; G06F 8/41–423;

(Continued)

(56) References Cited

U.S. PATENT DOCUMENTS 5,835,771 A    11/1998 Veldhuizen et al.
5,950,003 A     9/1999 Kaneshiro et al.

(Continued)

OTHER PUBLICATIONS

Miles et al., Optimizing Application Performance on Cray Systems with PGI Compilers and Tools, published GUG 2006 Procedings, 2006, pp. 1-7.*

(Continued)

*Primary Examiner* — S. Sough
*Assistant Examiner* — Zheng Wei
(74) *Attorney, Agent, or Firm* — Park, Vaughan, Fleming & Dowler LLP

(57) ABSTRACT

A parallelization assistant tool system to assist in parallelization of a computer program is disclosed. The system directs the execution of instrumented code of the computer program to collect performance statistics information relating to execution of loops within the computer program. The system provides a user interface for presenting to a programmer the performance statistics information collected for a loop within the computer program so that the programmer can prioritize efforts to parallelize the computer program. The system generates inlined source code of a loop by aggressively inlining functions substantially without regard to compilation performance, execution performance, or both. The system analyzes the inlined source code to determine the data-sharing attributes of the variables of the loop. The system may generate compiler directives to specify the data-sharing attributes of the variables.

20 Claims, 8 Drawing Sheets

(52) U.S. Cl.
CPC .............. *G06F 8/443* (2013.01); *G06F 8/456* (2013.01); *G06F 11/3404* (2013.01); *G06F 11/3419* (2013.01); *G06F 11/3452* (2013.01)

(58) Field of Classification Search
CPC .. G06F 8/4441; G06F 8/4443; G06F 11/3404; G06F 3/3409; G06F 3/3419; G06F 3/3452
See application file for complete search history.

(56) References Cited

U.S. PATENT DOCUMENTS

| | | | |
|---|---|---|---|
| 6,230,313 B1 | 5/2001 | Callahan, II et al. | |
| 6,367,071 B1* | 4/2002 | Cao | G06F 8/443 712/E9.058 |
| 6,519,766 B1 | 2/2003 | Barritz et al. | |
| 6,708,331 B1* | 3/2004 | Schwartz | G06F 8/452 717/160 |
| 6,986,130 B1* | 1/2006 | Boucher | G06F 8/4441 717/150 |
| 7,367,024 B2* | 4/2008 | Barua | G06F 9/5016 717/157 |
| 7,549,085 B2 | 6/2009 | Del Vigna, Jr. et al. | |
| 7,640,536 B1 | 12/2009 | Whalen et al. | |
| 7,770,152 B1 | 8/2010 | Kamen et al. | |
| 7,849,449 B2 | 12/2010 | Andrade et al. | |
| 7,865,885 B2* | 1/2011 | Wu | G06F 9/466 717/136 |
| 8,185,875 B2* | 5/2012 | Kahlon | G06F 8/433 717/126 |
| 8,381,195 B2 | 2/2013 | Messerly et al. | |
| 8,479,166 B2* | 7/2013 | Nir-Buchbinder | G06F 9/52 717/126 |
| 8,516,468 B2 | 8/2013 | Ng et al. | |
| 8,561,040 B2* | 10/2013 | Rose | G06F 9/45516 717/148 |
| 8,572,595 B1 | 10/2013 | Lethin et al. | |
| 8,713,518 B2 | 4/2014 | Caliga et al. | |
| 8,762,974 B1* | 6/2014 | Smith | G06F 8/423 717/141 |
| 8,789,032 B1* | 7/2014 | Li | G06F 8/4443 717/151 |
| 8,972,959 B2* | 3/2015 | Ishizaki | G06F 8/458 717/143 |
| 2002/0062478 A1 | 5/2002 | Ishikawa et al. | |
| 2003/0110481 A1 | 6/2003 | Wada et al. | |
| 2004/0073891 A1 | 4/2004 | Boucher et al. | |
| 2004/0226006 A1* | 11/2004 | Russell | G06F 17/5045 717/154 |
| 2004/0250240 A1 | 12/2004 | Stoodley et al. | |
| 2005/0034106 A1 | 2/2005 | Kornerup et al. | |
| 2005/0262491 A1 | 11/2005 | Gu et al. | |
| 2005/0283780 A1* | 12/2005 | Karp | G06F 9/3004 718/100 |
| 2006/0047670 A1 | 3/2006 | Yu et al. | |
| 2006/0080643 A1 | 4/2006 | Ogawa et al. | |
| 2008/0126764 A1* | 5/2008 | Wu | G06F 9/466 712/226 |
| 2008/0178156 A1* | 7/2008 | Kahlon | G06F 8/433 717/126 |
| 2009/0235237 A1 | 9/2009 | Song et al. | |
| 2009/0328021 A1 | 12/2009 | Ng et al. | |
| 2010/0050161 A1* | 2/2010 | Nir-Buchbinder | G06F 9/52 717/126 |
| 2010/0199257 A1* | 8/2010 | Biggerstaff | G06F 8/76 717/104 |
| 2010/0229161 A1* | 9/2010 | Mori | G06F 8/456 717/149 |
| 2010/0235819 A1* | 9/2010 | Rose | G06F 9/45516 717/139 |
| 2010/0275190 A1* | 10/2010 | Ishizaki | G06F 8/458 717/149 |
| 2010/0333074 A1* | 12/2010 | Supalov | G06F 9/546 717/136 |
| 2011/0067008 A1* | 3/2011 | Srivastava | G06F 11/3466 717/128 |
| 2011/0093837 A1* | 4/2011 | Guenthner | G06F 8/45 717/149 |
| 2012/0054722 A1* | 3/2012 | Takeda | G06F 8/314 717/128 |
| 2013/0239094 A1* | 9/2013 | Nir-Buchbinder | G06F 9/52 717/126 |
| 2014/0130021 A1* | 5/2014 | Lin | G06F 9/38 717/136 |
| 2014/0189663 A1 | 7/2014 | Guenthner et al. | |
| 2014/0208072 A1 | 7/2014 | Cadambi et al. | |
| 2014/0281323 A1 | 9/2014 | Duluk et al. | |
| 2014/0380101 A1* | 12/2014 | Yu | G06F 11/3636 714/38.1 |
| 2015/0089468 A1 | 3/2015 | Poxon et al. | |

OTHER PUBLICATIONS

PGI Compiler User's Guide Parallel Fortan, C and C++ for Scientists and Engineers Release 2013, published by the POrtland Group, 2013, pp. 1-224.*
Grune et al., Modern Compiler Design, John Wiley & Sons, Ltd, 20, p. 368 (Year: 2002).*
Robert Morgan, Building an Optimizing Compiler, Publisher Butterworth-Heinemann, 1998, p. 21-23, p. 236-237 (Year: 1998).*
PGI Compiler User's Guide Parallel Fortan, C and C++ for Scientists and Engineers, Release 2012, Retrieved online [https://www.pgroup.com], pp. 1-204 (Year: 2012).*
Allen; Optimizing Compilers for Modern Architectures; pp. 102; copyright 2002.
Ayers et al., Aggressive Inlining, published by ACM 1997, pp. 134-145.
Elsesser et al; Load Balancing of DOALL loops in the Perfect Club, pp. 129-133; copyright 1993 IEEE.
Encyclopedia of Parallel Computing; Copyright 2011 by Springer Science+Business Media LLC; Chapter No. 00055; pp. 9.
Message Passing Interface (MPI)—Wikipedia, Accessed Sep. 6, 2013; pp. 13; Link en.wikipedia.org/wiki/Message_Passing_Interface.
Ngo, V.N., "Parallel Loop Transformation Techniques for Vector-based Multiprocessor Systems," Ph.D. thesis, University of Minnesota, 1994.
Ngo, V.N., Elsesser, G., Bhattacharya, S., and Tsai, W.T., "Array Covering: A Technique for Enabling Loop Parallelization," ICPP(2), 1992.
OpenACC—Wikipedia, Accessed Sep. 6, 2013; pp. 2; Link en.wikipedia.org/wiki/OpenACC.
OpenMP (Open Multi-Processing)—Wikipedia, Accessed Aug. 19, 2013; pp. 14; Link: en.wikipedia.org/wiki/OpenMP#Reduction.
OpenMP Application Program Interface, Version 4.0, Jul. 2013, published by OpenMP architecutre Review Board, pp. 1-320.

* cited by examiner

Parallelization Assistant Tool

| Top Loops Timing | | Line No. | Source: //...sweepz.f90 |
|---|---|---|---|
| | sweepz.f90 | | |
| | SWEEPZ | | |
| 6.57 | Loop@45 | 45. | do k = 1, ks |
| 6.56 | Loop@46 | 46. | do i = 1, isy |
| | sweepy.t90 | 47. | radius = zxc(i+mypey*isy) |
| | SWEEPY | 48. | ! Put state variables into 1D arrays |
| 6.32 | Loop@32 | 49. | do m = 1, npey |
| 5.91 | Loop@36 | 50. | do j = 1, js |
| | sweepyx2.t90 | 51. | n = j + js*(m-1) + 6 |
| | SWEEP4X2 | 52. | r(n) = recv1(1,k,j,i,m) |
| 3.12 | Loop@64 | 53. | p(n) = recv1(2,k,j,i,m) |
| 3.05 | Loop@68 | 54. | u(n) = recv1(4,k,j,i,m) |
| . | . | 55. | v(n) = recv1(5,k,j,i,m) |
| . | . | 56. | w(n) = recv1(3,k,j,i,m) |
| | | 57. | f(n) = recv1(6,k,j,i,m) |
| | | 58. | enddo |
| | | 59. | enddo |
| | | 60. | do j = 1, jmax |
| | | 61. | n = j + 6 |

*FIG. 1*

Data-Storing Attributes for // ... sweepz.f90

| Variable | Type | D-S Attribute | Information |
|---|---|---|---|
| f | Array | Unresolved | FAIL: Last defining iteration not known for variable that is live on exit<br>WARN: LastPrivate of array may be very expensive |
| ... | | | |
| zxc | Array | Conflict | |
| k | Scalar | Private | |
| i | Scalar | Private | |
| radius | Scalar | Private | FAIL: incompatable with 'natural' scope. |
| ... | | | |
| r | Array | Private | WARN: LastPrivate of array may be very expensive |
| p | Array | Private | WARN: LastPrivate of array may be very expensive |
| ... | | | |
| ks | Scalar | Shared | |
| isy | Scalar | Shared | |

[ Show Directives ]  [ Insert Directives ]

*FIG. 2A*

```
!$OMP  parallel do default(none) &
!$OMP& unresolved (f,flat,....) &
!$OMP& private   (i,j,k,m,n...) &
!$OMP& shared    (isy,js,ks,mypey...)
```

*FIG. 2B*

```
! Directive inserted by Parallelization Tool.
!$OMP  parallel do default(none) &
!$OMP&    unresolved (f,flat,. . . ) &
!$OMP&    private  (i,j,k,m,n . . . ) &
!$OMP&    shared   (isy,js,ks,mypey . . . )
do k = 1, ks
  do i = 1, isy
    radius = zxc(i+mypey*isy)
    ! Put state variables into 1D arrays
    do m = 1, npey
      do j = 1, js
        n = j + js*(m-1) + 6
        r(n) = recv1(1,k,j,i,m)
        p(n) = recv1(2,k,j,i,m)
        u(n) = recv1(4,k,j,i,m)
        v(n) = recv1(5,k,j,i,m)
        w(n) = recv1(3,k,j,i,m)
        f(n) = recv1(6,k,j,i,m)
      enddo
    enddo
    do j = 1, jmax
      n = j + 6
```

*FIG. 3*

ASSISTING PARALLELIZATION OF A COMPUTER PROGRAM

CROSS-REFERENCE TO RELATED APPLICATION(S)

This application is a continuation of U.S. patent application Ser. No. 14/033,306 filed Sep. 20, 2013, entitled "ASSISTING PARALLELIZATION OF A COMPUTER PROGRAM," which is incorporated herein by reference in its entirety.

BACKGROUND

The architectures of High Performance Computer ("HPC") systems are supporting increasing levels of parallelism in part because of advances in processor technology. An HPC system may have thousands of nodes with each node having 32, 64, or even more processors (e.g., cores). In addition, each processor may have hardware support for a large number of threads. The nodes may also have accelerators such as GPUs and SIMD units that provide support for multithreading and vectorization.

Current computer programs are typically developed to use a single level of parallelism. As a result, these computer programs cannot take advantage of the increasing numbers of cores and threads. These computer programs will need to be converted to take advantage of more computing resources by adding additional levels of parallelism. Because of the complexities of the architectures of such HPC systems and because of the increasing complexity of computer programs, it can be a challenge to convert existing, or even develop new, computer programs that take advantage of the high level of parallelism. Although significant advances in compiler technology have been made in support of increased parallelism, compilers still depend in large part on programmers to provide directives to help guide the compilers on determining which portions of a program can be parallelized. Similarly, because of these increased complexities in the architectures and computer programs, programmers can find it challenging to generate code to take advantage of such parallelism or to even determine what compiler directives would be effective at guiding a compiler. An incorrect compiler directive or incorrect decision made by a compiler may result in a compiled program with the wrong behavior, which can be very difficult to detect and correct. Moreover, it can be difficult to even determine whether such complex computer programs are behaving correctly.

BRIEF DESCRIPTION OF THE DRAWINGS

FIG. 1 illustrates a display page of performance statistics of a PAT system in some embodiments.

FIG. 2A illustrates a dialog box that displays the data-sharing attributes of the variables of a function in some embodiments.

FIG. 2B illustrates a dialog box that shows the directives in some embodiments.

FIG. 3 illustrates the source code a display page with the compiler directive inserted.

DETAILED DESCRIPTION

Figure 4:
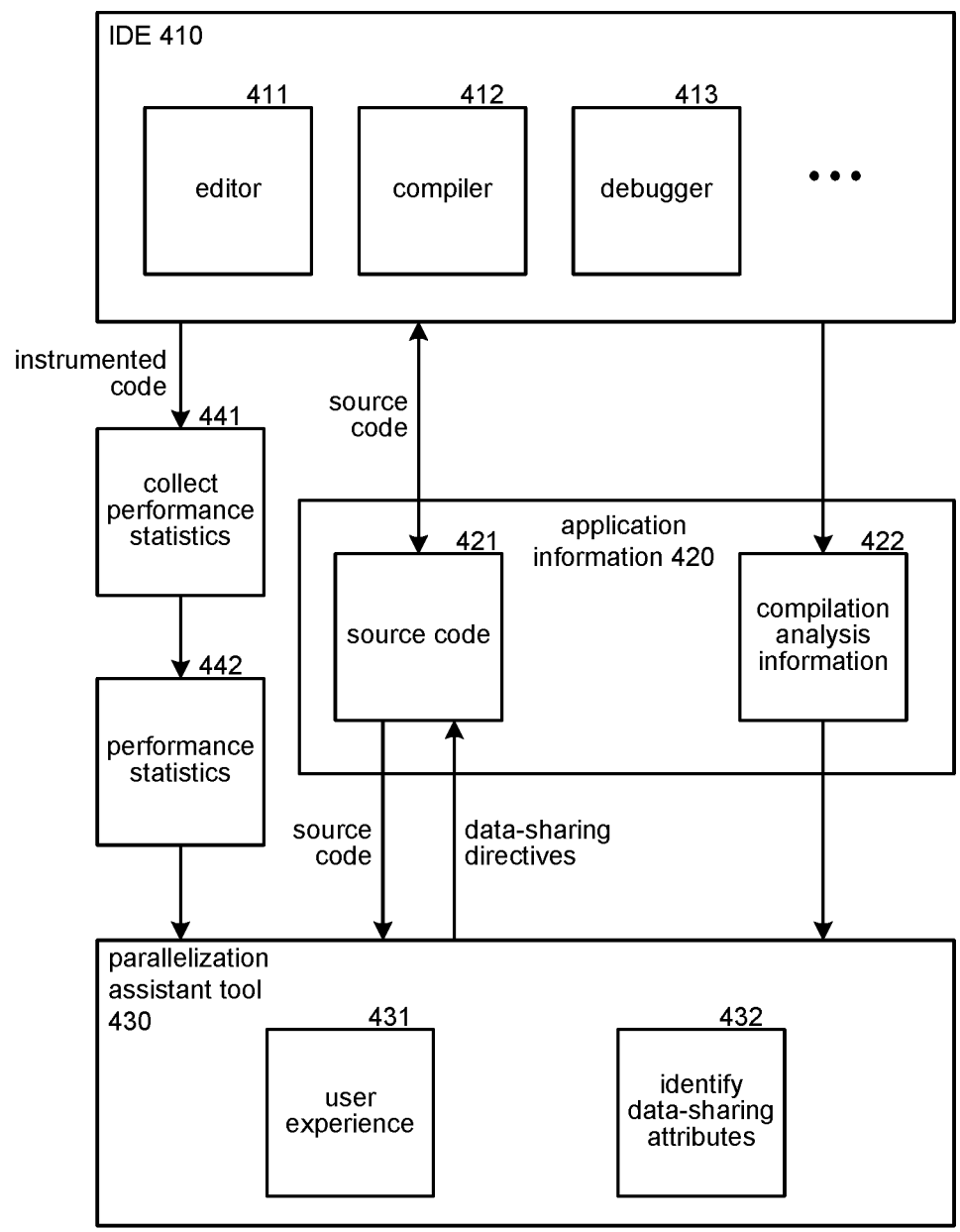
FIG. 4 is a block diagram that illustrates components used in the development and optimization of a computer program in some embodiments.

A method and system for assisting a programmer in the parallelization of a computer program is provided. In some embodiments, a parallelization assistant tool ("PAT") system combines compilation analysis information, execution performance statistics information, and data-sharing attribute analysis information to assist a programmer in deciding how to modify source code to take advantage of additional levels of parallelism required on HPC systems for optimal performance. The modifications to the source code may include reorganizing portions of the code, adding compiler directives to the source code to provide direction to the compiler, and so on. The PAT system may interface with performance measurement and analysis tools that generate an executable version of the computer program that is instrumented to collect performance statistics relating to execution of loops. For example, the performance statistics may include the number of times a loop was executed and, for each execution of the loop, the execution time and number of iterations for that execution of the loop. The PAT system receives the performance statistics after execution of the instrumented computer program. The PAT system presents to the programmer the performance statistics for a loop along with the source code for the loop. The PAT system may allow the performance statistics to be presented to the programmer in various ways. For example, the performance statistics may be ordered starting with the loop with the highest execution time, with the function with the highest total execution times of its loops, and so on. The PAT system may also present compilation analysis information generated by the compiler. For example, the compilation analysis information may identify functions that were inlined within a loop, identify loop reductions, provide reasons why certain optimizations were not made, and so on.

The performance statistics information and the compilation analysis information can help the programmer decide on which portions of the computer program to focus their parallelization efforts. To further assist the programmer, the PAT system analyzes the computer program to determine the data-sharing attributes of the variables also referred to as data scoping. Data-sharing attributes are described in "OpenMP Application Program Interface," version 4.0, July 2013, published by the OpenMP Architectural Review Board, which is hereby incorporated by reference. The data-sharing attributes indicate generally whether a variable is shared by threads that execute as a team or whether each thread has its own private copy of the variable. The data-sharing attributes include "shared," "private," "firstprivate," "lastprivate," and so on. By knowing such information, a compiler can correctly parallelize, for example, a loop. If a compiler cannot determine the data-sharing attributes of a variable, the compiler cannot safely parallelize that loop. Techniques for determining data-sharing attributes are described in Allen, R. and Kennedy, K., "Optimizing Compilers for Modern Architectures: A Dependence-based Approach," Academic Press, 2002; Ngo, V. N., Elsesser, G., Bhattacharya, S., and Tsai, W. T., "Array Covering: A Technique for Enabling Loop Parallelization," ICPP(2), 1992; and Ngo, V. N., "Parallel Loop Transformation Techniques for Vector-based Multiprocessor Systems," Ph.D. thesis, University of Minnesota, 1994, which are hereby incorporated by reference.

The PAT system performs a data-sharing analysis of the source code to determine the data-sharing attributes of variables. The PAT system may generate a version of the source code with functions aggressively inlined wherein inlining is possible and then perform the data-sharing analysis on the aggressively inlined source code. Inlining is not possible, for example, where the code for the function cannot be identified because the function is called indirectly (e.g., a virtual function or a Fortran formal function). The source code is aggressively inlined in the sense that the inlining is done without regard to compilation performance, execution performance, or both. Since the aggressive inlining is to facilitate data-sharing analysis and aggressive inlined source code is not intended to be compiled or executed, the speed of compilation or execution is irrelevant. Because of the aggressive inlining, conventional data-sharing analysis techniques can be employed on high-level loops, for example those that include a complex chain of functions, to provide a more accurate picture of the data-sharing attributes than would be provided with conventional inlining. In addition, unlike a conventional compiler, the PAT system continues the data-sharing analysis for a loop even when it has determined that the loop cannot safely be parallelized. By continuing the data-sharing analysis, the PAT system can provide to the programmer the results of the data-sharing analysis for all variables of a loop and not just the variables analyzed before determining that the loop cannot be safely parallelized. The PAT system also identifies variables whose data-sharing attributes cannot be determined and identifies variables whose data-sharing attributes conflict with those specified in a compiler directive. A programmer can focus their efforts on these "unresolved" and "conflicting" data-sharing attributes.

In some embodiments, the PAT system generates compiler directives to define the data-sharing attributes of variables and may insert the directives into the source code. If the PAT system identifies a variable whose data-sharing attributes cannot be determined, it may generate an invalid compiler directive identifying that the data-sharing attributes of the variable cannot be resolved. The PAT system may insert the invalid compiler directive into the source code as a reminder to the programmer of the unresolved variables and to prevent compilation of the source code. Because the compiler directive is invalid, the compiler will not compile the source code until the invalid compiler directive is removed. When a programmer edits the source code using an integrated development environment, the programmer will notice that the data-sharing attributes of certain variables are unresolved and then can specify the data-sharing attributes of the variables by adding them to the appropriate valid compiler directive.

FIG. 1 illustrates a display page of performance statistics of a PAT system in some embodiments. A display page 100 includes a performance statistics area 110 and a source code area 120. The performance statistics area lists the execution times of loops within the computer program. For example, entry 121 indicates that the loop starting at line 45 within the function SWEEPZ had an execution time of 6.57 seconds, and entry 122 indicates that the loop starting at line 46 within the same function had an execution time of 6.56 seconds. These execution times may be inclusive execution times and may represent a total of the execution times of each execution of the loop. The source code area lists the source code for the selected loop along with the line numbers within the function that contains the loop. In this example, the programmer has selected the loop starting at line 45. A programmer can focus their efforts to increase parallelization on the loops with the largest execution time, rather than spending time on loops whose parallelization would have minimal impact on the overall performance of the computer program. The PAT system may also display compilation analysis information provided by a compiler as to what optimizations were made and the reasons for making or not making optimizations.

FIG. 2A illustrates a dialog box that displays the data-sharing attributes of the variables of a function in some embodiments. A dialog box 200 lists the data sharing attributes for the variables of a selected loop. A variable column 201 identifies the variables. A type column 202 identifies the types of the variables. A data-sharing attribute column 203 identifies the data-sharing attributes of the variables or whether the attributes are unresolved or whether they conflict. An information column 204 provides information on the data-sharing attributes. The "unresolved" value in the data-sharing attribute column indicates that the data-sharing attribute for that variable could not be determined, and the information column provides the reason why. For example, the data-sharing attribute for the array f could not be determined because it could not be determined which iteration would be the last one to set the value for the array f, which is alive outside of the loop. The "conflict" value in the data-sharing attribute column may indicate that the PAT system identified a data-sharing attribute for that variable that is different from that specified by a compiler directive. A programmer would focus their dependence analysis efforts on the variables that are flagged as having issues, rather than spending time on analyzing variables whose data-sharing attributes can automatically be determined. Dialog box 200 includes a show directives button 205 and an insert directives button 206. The show directives button allows the programmer to see the directives that would be generated for the displayed variables. The insert directives button allows the programmer to automatically insert the directives into the source code. FIG. 2B illustrates a dialog box that shows the directives in some embodiments. FIG. 3 illustrates the source code of display page 100 with the compiler directive inserted.

FIG. 4 is a block diagram that illustrates components used in the development and optimization of a computer program in some embodiments. An integrated development environment ("IDE") 410 includes an editor 411, a compiler 412, and a debugger 413, and may include other components to support the development of a computer program. The editor is used to create the source code 421, and the compiler compiles source code and generates compilation analysis information 422, which are stored in an application information repository 420. The components of the IDE may be conventional components or may be augmented to support the PAT system. For example, the compiler may be adapted to add hooks into the compiled code that can be used for instrumenting the various loops within the computer program. Although the source code itself could be instrumented to collect performance statistics, the compiler may make various optimizations that would render the collected performance statistics meaningless, or the instrumentation may interfere with the optimizations. For example, a compiler may combine loops and rearrange the statements resulting in only one loop, but with instrumentation for multiple loops. Thus, the compiler may generate instrumented code, which is provided to a collect performance statistics component 441. The collect performance statistics component controls the execution of the instrumented code and the storing of the performance statistics collected by the instrumented code in a performance statistics repository 442. The instrumented code may collect the start time at which execution of each loop begins and the end time at execution of each loop end, with the difference being the execution time of the loop.

A parallelization assistant tool 430 includes a user experience component 431 and an identify data-sharing attributes component 432. The user experience component controls the overall presenting of the display pages and dialogs of the PAT system. The identify data-sharing attributes component generates aggressively inlined source code and then analyzes the inlined source code to determine the data-sharing attributes of the variables.

The computing devices on which the PAT system may be implemented may include a central processing unit, input devices, output devices (e.g., display devices and speakers), storage devices (e.g., memory and disk drives), network interfaces, graphics processing units, and so on. The input devices may include keyboards, pointing devices, touch screens, and so on. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the PAT system. The data transmission media is media for transmitting data using propagated signals or carrier waves (e.g., electromagnetism) via a wire or wireless connection.

The PAT system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the PAT system may be implemented in hardware using, for example, an application-specific integrated circuit ("ASIC").

Figure 5:
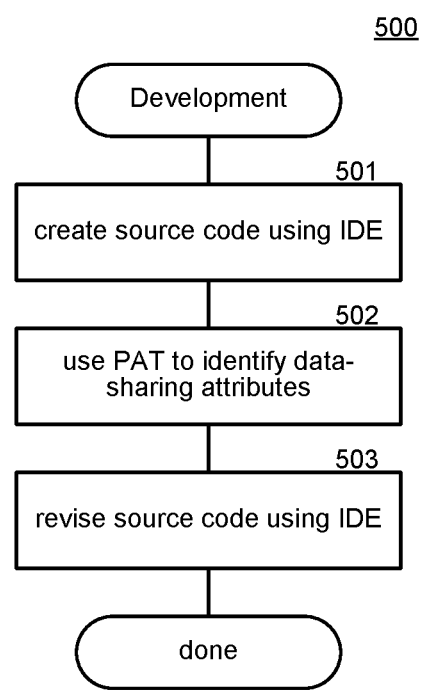
FIG. 5 is a flow diagram that illustrates the overall development process when using the PAT system in some embodiments.

FIG. 5 is a flow diagram that illustrates the overall development process when using the PAT system in some embodiments. As illustrated in block 501, a programmer creates and tests the source code of a computer program using an IDE. As illustrated in block 502, after creating the source code, the programmer uses the PAT system to identify the variables whose data-sharing attributes need to be resolved to increase parallelization. Because the PAT system includes performance statistics, the programmer can concentrate their efforts on those variables whose resolution will result in parallelization that will most improve performance of the computer program. As illustrated in block 503, the programmer revises the source code and adds or modifies compiler directives to increase parallelization using an IDE. As discussed above, the PAT system may automatically revise source code to add certain compiler directives.

Figure 6:
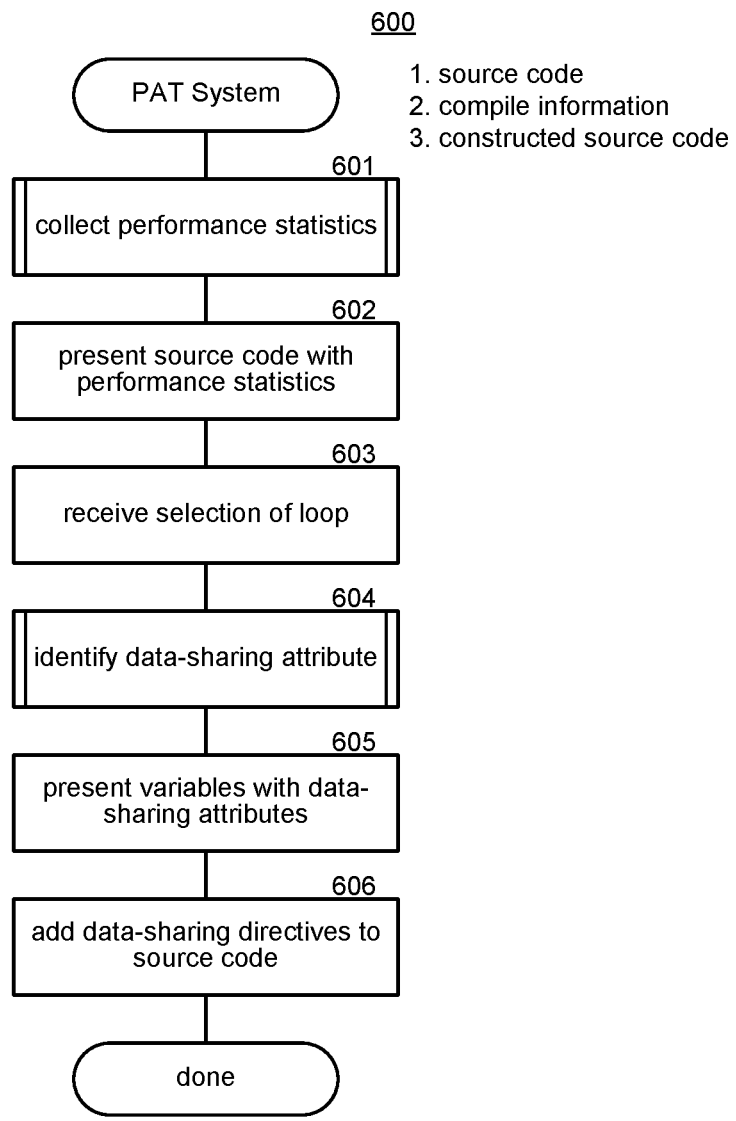
FIG. 6 is a flow diagram that illustrates the processing of the PAT system in some embodiments.

FIG. 6 is a flow diagram that illustrates the processing of the PAT system in some embodiments. The PAT system inputs application information including source code and compilation analysis information. In block 601, the component invokes the collect performance statistics component to collect the performance statistics for the source code. Alternatively, the collect performance statistics component can be executed outside of the PAT system with the performance statistics being input to the PAT system. In block 602, the PAT system presents the source code with performance statistics to the programmer as illustrated, for example, in FIG. 1. In block 603, the PAT system receives a selection of a loop by the programmer, such as the loop starting at line 45 of FIG. 1. In block 604, the PAT system invokes an identify data-sharing attribute component to identify the data-sharing attributes of the selected loop. In block 605, the component presents the variables of the loop with their data-sharing attributes as illustrated in, for example, FIG. 2. In block 606, the component may display compiler directives corresponding to the data-sharing attributes or insert those directives into the source code and then completes.

Figure 7:
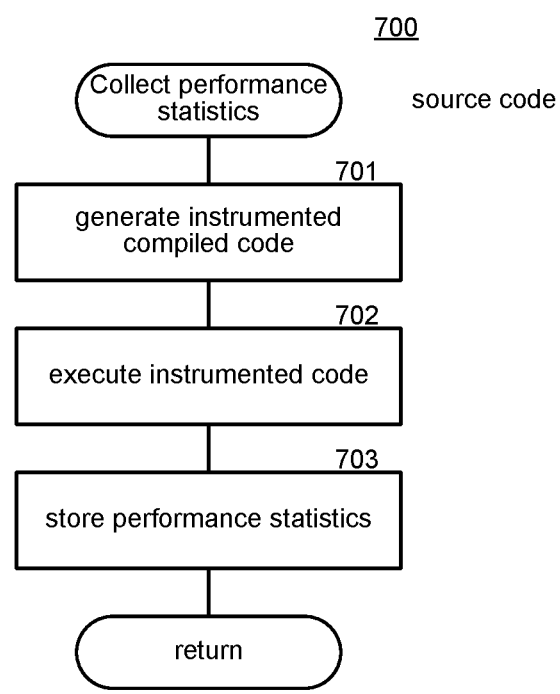
FIG. 7 is a flow diagram that illustrates the processing of a collect performance statistics component of the PAT system in some embodiments.

FIG. 7 is a flow diagram that illustrates the processing of a collect performance statistics component of the PAT system in some embodiments. The collect performance statistics component 700 may be provided with source code and instrumented compiled code that was generated during the compilation process. In block 701, if instrumented compiled code is not provided, then the component directs the compiler to generate the instrumented compiled code. In block 702, the component launches execution of the instrumented compiled code. In block 703, the component stores the performance statistics generated by the instrumented compiled code in the performance statistics repository and then returns.

Figure 8:
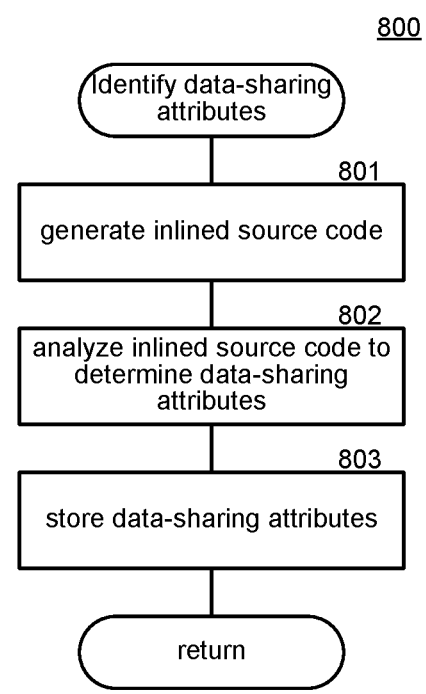
FIG. 8 is a flow diagram that illustrates the processing of an identify data-sharing attributes component of the PAT system in some embodiments.

FIG. 8 is a flow diagram that illustrates the processing of an identify data-sharing attributes component of the PAT system in some embodiments. The identify data-sharing attributes component 800 uses the application information to perform aggressive inlining of the source code to assist in the analysis of the data-sharing attributes. In block 801, the component generates aggressively inlined source code. The component may use subsystems of a compiler with relaxed heuristics that would normally suppress inlining so that essentially all functions that can be inlined are inlined. In block 802, the component analyzes the inlined source code to determine the data-sharing attributes. In block 803, the component stores the data-sharing attributes in the application information repository and then returns.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device for assisting in development of a computer program that includes a loop with an invocation of an invoked function, the method comprising:
   accessing a source code version of the computer program;
   generating an inlined source code version of the computer program, the inlined source code version generated by inlining, within the source code version, source code of the invoked function wherein the invoked function will not be inlined in a compiled version of the computer program that is generated by a compiler;
   analyzing the inlined source code version to determine a data-sharing attribute of a variable of the loop;

adding to the source code version a compiler directive based on the data-sharing attribute; and generating by the compiler a compiled version of the computer program by compiling the source code version with the compiler directive and without the source code of the invoked function inlined.

2. The method of claim 1 further comprising when the data-sharing attribute of the variable cannot be determined, outputting an indication that the data-sharing attribute is unresolved.

3. The method of claim 2 further comprising when the data-sharing attribute of the variable is indicated as being unresolved, inserting into the source code version an invalid compiler directive to indicate that the variable is unresolved.

4. The method of claim 2 further comprising when the data-sharing attribute of the variable is indicated as being unresolved, outputting an indication of a reason why the variable cannot be resolved.

5. The method of claim 1 wherein the compiling of the source code parallelizes the loop when the data-sharing attribute of the variable indicates that parallelization is safe.

6. The method of claim 1 wherein the compiling of the source code parallelizes the loop when the data-sharing attribute of the variable indicates that parallelization is safe.

7. A computer-readable storage medium storing computer-executable instructions for controlling a computing device to assist in development of a computer program that includes a loop with an invocation of an invoked function, the computer-executable instructions comprising instructions that:

access a source code version of the computer program;

generate an inlined source code version of the computer program, the inlined source code version generated by inlining, within the source code version, source code of an invoked function wherein the invoked function will not be inlined in a compiled version of the computer program that is generated by a compiler;

analyze the inlined source code version to determine a data-sharing attribute of a variable of the loop;

add to the source code version a compiler directive based on the data-sharing attribute; and generate, by the compiler, a compiled version of the computer program by compiling the source code version with the compiler directive and without the source code of the invoked function inlined.

8. The computer-readable storage medium of claim 7 wherein the inlining of the invoked function is without regard to either compilation performance or execution performance.

9. The computer-readable storage medium of claim 7 wherein the compiler directive is to assist the compiler in improving parallelization of the computer program.

10. The computer-readable storage medium of claim 7 wherein the instructions further comprise instructions that parallelize the loop during compilation of source code version of the computer program based on the compiler directive indicating to parallelize the loop.

11. The computer-readable storage medium of claim 7 wherein the instructions further comprise instructions that parallelize the loop during compilation of the computer program.

12. A computing system for assisting in development of a computer program that includes a loop within an invocation of an invoked function, the computing system comprising:

one or more computer-readable storage media storing computer-executable instructions that:

access a source code version of the computer program;

generate an inlined source code version of the computer program, the inlined source code generated by inlining, within the source code version, source code of the invoked function, wherein the invoked function will not be inlined in a compiled version of the computer program that is generated by a compiler;

analyze the inlined source code version to determine a data-sharing attribute of a variable of the loop;

add to the source code version a compiler directive based on the data-sharing attribute; and generate, by the compiler a compiled version of the computer program by compiling the source code version with the compiler directive and without the source code of the invoked function inlined; and a processor that executes the computer-executable instructions stored in the one or more computer-readable storage media.

13. The computing system of claim 12 wherein the computer-executable instructions further, when the data-sharing attribute of the variable cannot be determined, output an indication that the data-sharing attribute is unresolved.

14. The computing system of claim 13 wherein the computer-executable instructions further, when the data-sharing attribute of a variable is indicated as being unresolved, inserting into the source code an invalid compiler directive to indicate that the variable is unresolved.

15. The computing system of claim 13 wherein the computer-executable instructions further, when the data-sharing attribute of the variable is indicated as being unresolved, output an indication of a reason why the variable cannot be resolved.

16. The computing system of claim 12 wherein the inlined source code is inlined without regard to either compilation performance or execution performance.

17. The computing system of claim 12 wherein the inlined source code is not compiled.

18. The computing system of claim 12 wherein the data-sharing attribute indicates whether the variable is private or shared.

19. The computing system of claim 12 wherein the instructions further comprise instructions that parallelize the loop during compilation of the computer program based on the compiler directive that specifies data-sharing attributes of the variables.

20. The computing system of claim 12 wherein the instructions further comprise instructions that parallelize the loop during compilation of the computer program based on the compiler directive that specifies data-sharing attributes of the variables and without inlining the invoked function.

* * * * *